March 2, 1971     H. WIEDERKEHR     3,567,235
TOOL HOLDERS
Filed Oct. 17, 1968     3 Sheets-Sheet 1
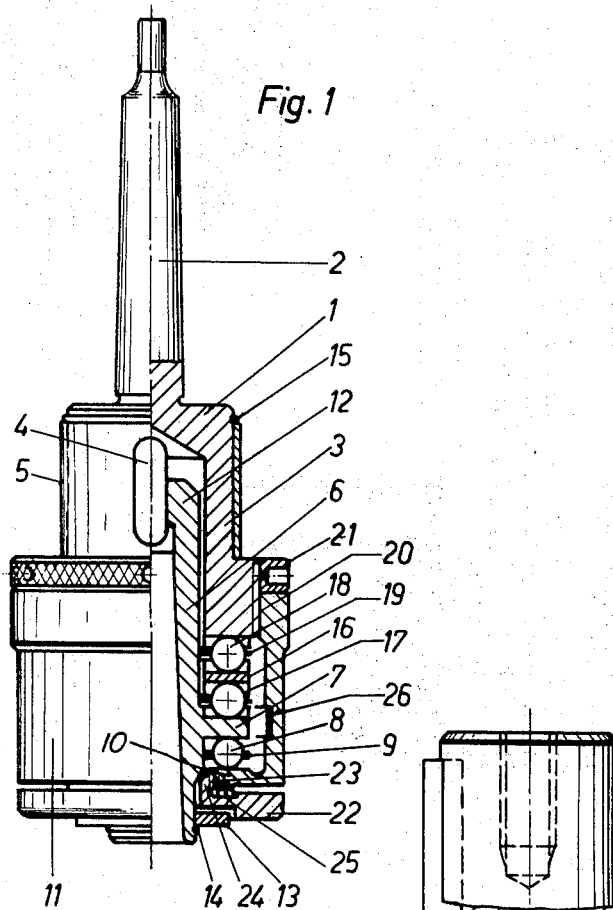
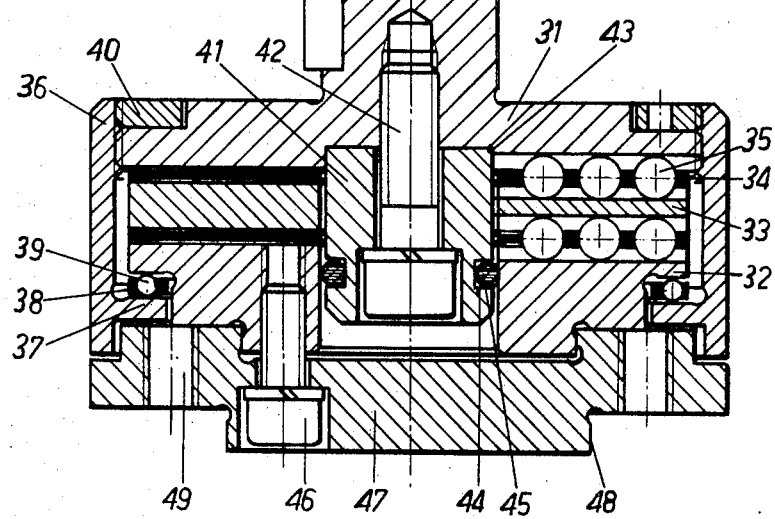

United States Patent Office 3,567,235
Patented Mar. 2, 1971

3,567,235
TOOL HOLDERS
Hans Wiederkehr, Ifangstrasse 107,
Rumlang, Switzerland
Filed Oct. 17, 1968, Ser. No. 768,402
Claims priority, application Switzerland, Oct. 18, 1967,
14,552/67
Int. Cl. B23b 31/02
U.S. Cl. 279—16
6 Claims

ABSTRACT OF THE DISCLOSURE

A tool holder for use with machine tools having means for permitting the axis of rotation of the tool to become offset from the axis of rotation of the tool holder. This is accomplished by providing a coupling plate with ball bearings on either side between the driving part and the driven part of the tool holder. The tool holder maintains the offset axes in absolute parallelism with each other.

BACKGROUND OF THE INVENTION

For the finishing of cored or rough-drilled holes, one customarily works successively with counterbores and reamers. The repeated changing of tools is always time-consuming and tiring for the operator, especially if it involves numerous drilled holes and numerous workpieces. In such a case, the workpiece either must be accurately aligned or the tools require frequent changing. For this reason tool holders have been developed which partly eliminate the described drawbacks. These tool holders have either rubber joints, universal joints or spring joints between the driving and the driven parts whereby the tool is supported in the driven part and is to some extent capable of being radially off-set together with the driven part relative to the driving part.

Furthermore, tool holders have been known wherein the coupling between the driving and driven parts is achieved based on the principle of the rotating cross loop. The coupling part is at rest relative to the two other parts only when they are in alignment. As the tool holders are, however, just needed for unaligned axes and as the coupling part thus exerts motions against the driving and driven parts, balls are positioned between the individual parts so that there exists a rolling motion between the parts of such a coupling. Although the balls reduce friction between facing parts, they have several disadvantages. It is an essential condition for the machining of accurate borings within close limits that on displacement of the driven part against the driving part a floating bush assures parallelism of the two axes. But when balls are used as coupling means, there easily occurs play or yielding in the ways, which then no longer guarantees parallelism of the axes of the driven and the driving parts. In order to improve parallel fit, different balls are used for transmission of torsional moment and of axial force. Such couplings are, however, expensive and still unable to satisfactorily assure the parallelism of the driving and the driven parts.

SUMMARY OF THE INVENTION

This invention relates to a rotating tool holder for use with a machine tool spindle wherein the rotation axis of the tool holder is movable relative to that of the spindle but wherein the rotation axes are always maintained parallel to each other. The tool holder includes a driving part, a driven part and a coupling plate, these three parts being coupled together through the use of ball bearings.

It is the object of this invention to provide a tool holder which does not have the described disadvantages and which is characterized in that the coupling plate or disk and the driven part are supported in a housing that is connected with driving part and secured by a counter-ring screwed onto the driving part and exerting an initial axial stress on the housing, and in that the radial displacement of the driven part relative to the driving part can be limited by stops.

DESCRIPTION OF THE DRAWINGS

FIG. 1 is an elevation of the preferred embodiment of this invention, partly in section;

FIG. 2 is an elevation of a modified embodiment of this invention, in section;

FIG. 1 shows the driving part 1 of the tool holder. Driving part 1 consists of a coupling shank 2 and the head 3. By means of the coupling shank 2, e.g., a Morse taper shank or a round shank, the driving part 1 is brought into connection with the spindle of a machine tool. In the head 3 is a slot 4 which is covered or exposed by a revolvable sleeve 5 in which is likewise a similar slot (not illustrated).

Figure 3:
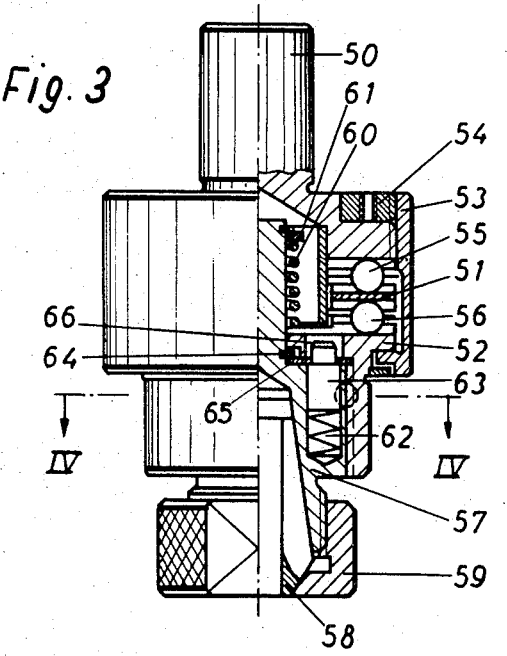
FIG. 3 is an elevation of another modified embodiment of this invention for use with a threading die head, partly in section.

Into the hollow space of the head 3 there projects the driven part 6. This rests with its flanged portion or collar 7 on a self-adjusting bearing 9 equipped with balls 8. The balls 8 rest in turn on the centrally inturned flanged collar 10 of the housing 11. The driven part 6 is designed as tool support and can take up conical as well as cylindrical tools with or without a collet. A support cam 12 prevents the rotation of Morse taper tools. At the lower end of the tool support or of the driven part 6 there is arranged a masking ring 13 which keeps dust from entering into the interior of the housing 11. The masking 13 as well as the sleeve 5 are held in position by spring rings 14 and 15.

Between the driving part 1 and the driven part 6 there is arranged inside the housing 11 the coupling plate 16. This plate is a circular disk which has on both sides grooves 17 of arcuate cross-section which are arranged at an angle of 90° to each other. For a better view they have, however, been drawn as parallel to each other in FIG. 1. For example, three such arcuate grooves are provided, and for example two balls 18 each are positioned therein so that the coupling plate 16 is guided by six balls on either side, positioned in a ball cage 19. A corresponding number of arcuate grooves is also provided on the face of the head 3 and in the flanged portion 7 of the driven part 6.

The housing 11 can be rotated by means of a screw connection 20 and is fixed—axially adjustable—at the head 3 of the driving part. A lock nut 21 abuts the interfacial edge of the housing 11. At the collar 10 of the housing 11 there is a rotatable outer ring 22 and affixed—axially movable—by means of a threaded screw connection 23. In its internal boring the outer ring 22 has a small cone 24 which lies opposite to a similar cone on the driven part 6 separated by a small gap. Turning the outer ring 22 alters the gap which represents a measuring means for the free mobility of the driven part 6. By means of this outer ring 22, the mobility of the driven part 6 can be adjusted to conditions existing in actual operations. The individual position of the outer ring 22 is fixed by a spring 25.

On the inner wall of the housing 11 there is provided a centering spring 26. This spring is for the purpose of limiting the free mobility of the driven part 6 and also for centering it in its rest position. It is obvious that the tool holder according to FIG. 1 may also be equipped with only one of the two limiting means 22 and/or 26.

FIG. 2 illustrates another embodiment of the tool holder. The tool holder includes the driving part 31, the driven part 32 and the coupling plate 33. The three parts mentioned have arcuate grooves in a manner similar to FIG. 1 in which are arranged the balls 35 guided in ball cage 34.

The three mentioned parts are held together by the housing 36 on whose collar 37 rests the driven part 32 by means of a ball cage 38 with balls 39. The housing 36 is screwed onto the driving part 31 and secured in position by a lock nut 40. In contrast to FIG. 1, the lock nut 40 in this case has an external thread and is screwed onto the housing 36 whereby it abuts against the driving part 31.

In the interior of the housing 36, a centering piece 41 is affixed by means of a screw 42 and centered in a recess 43. Inserted in the groove 44 is a non-metallic O-ring 45 which functions for the centering and limiting of the mobility of the driven part 32 in the same manner as the centering spring 26 in FIG. 1.

On the driven part 32 a mounting plate 47 is affixed by screw 46 and has a fitting area 48 onto which the tool can be centered and bolted with the aid of the tap-holes 49.

The tool holder operates as follows:

If the axis of the driving part does not lie exactly above the borehole to be worked, then the tool positioned in the driven part seeks its correct position without the occurrence of jamming or chafing. The axes of the driving and driven parts are parallel which fact is achieved by the special arrangement of the balls and by the initial stressing of the housing. Through the arrangement of the balls shown in FIG. 1, these balls take up the torsional moment as well as the axial force. The step bearing 39 is of importance only in case there occur axial forces in both directions, which, however, happens rather seldom. For simplification of the tool holder of the invention step bearings 39 may be omitted so that the collar of the driven part rests directly on collar 37 of the housing 36.

In order that the balls positioned between the driving part and the driven part can satisfactorily ensure the desired parallelism and accommodate the transmitted forces and torsional moments, it must be possible to sensitively adjust the housing and then to secure it so that the adjustment will not change.

In the tool holder of FIG. 2 the sensitive adjustment of the housing is also assured and thus a satisfactory parallelism of the driving part and driven part.

Like the satisfactory parallelism, the adjustability of the displacement path of the driven part is an essential condition without which the tool holder cannot satisfy in practical operation. Here, a centering as well as a limiting of the mobility may be of advantage. In some applications, it is sufficient to merely use the outer ring 22 shown in FIG. 1, whereas in other cases solely a centering may be of interest.

The use of six balls each between driving part, coupling plate and driven part results in a particularly favorable arrangement regarding the acting forces and torsional moments as well as regarding the strain on the coupling part.

Figure 4:
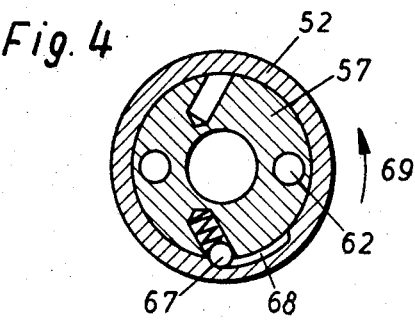
FIG. 4 is a view in section taken on line IV—IV of FIG. 3.
Figure 5:
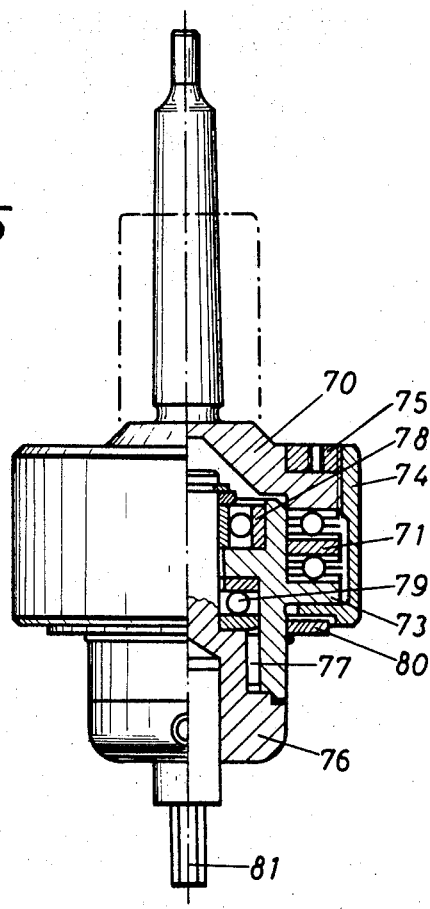
FIG. 5 is an elevation of another modified embodiment of this invention for use with a broaching tool.

In FIGS. 3 to 5 two other possible applications of the tool holder are shown. They differ from the embodiments of FIGS. 1 and 2 in that in the driven part another tool holder is supported which supports a tool and executes a relative motion compared to the driven part.

FIGS. 3 and 4 show a threading die head having a driving part 50, a coupling plate 51, a driven part 52 and a housing 53 which is biased in axial direction by means of a lock ring 54 whereby there exists a connection—by means of a screw thread—between the parts 50 and 53 on the one hand, and the parts 53 and 54 on the other hand. The coupling of the parts 50, 51 and 52 is achieved by means of two groups of balls 55, 56, one ball of each group being illustrated.

In the driven part 52, a tool support 57 is guided—axially movable. It has in its lower part a collet 58 which takes up the tool and which is tightened with a closer 59. In the upper part of the tool support there is arranged a spring 60 which rests on the driven part 52 and which lifts the tool support 57 by means of a locking ring 61. The tool support 57 has two axial bearings 62 in which is arranged a spring-supported pin 63 which is prevented from protruding by a disk 65 held with a locking ring 64. In FIG. 3 the tapering end of the pin 63 extends into the boring 66 in the bottom of the driven part 52. The disk 65 abuts the driven part 52 from below with the tool support 57 through the force of the spring 60.

In the tool support 57 there is further arranged an elastic cam 67 which engages into an axial groove 68. In FIG. 4 the tool holder rotates in arrow direction 69 and the cam 67 takes the tool support 57 along. If the holder rotates in the opposite direction, then the cam would not take along the tool support unless the pins 63 cause this by extending into the borings 66.

As long as the screw tap penetrates into the workpiece, the driving spindle with the tool holder is depressed. The penetration of the screw tap into the workpiece is limited by a stop arranged on the machine tool. As soon as this stop has been reached, the parts 50, 51 and 52 of the tool holder do not depress any further, but they still rotate the tool support 57 until the pins 63 are no longer engaged in the borings 66. Since the cam 67 runs freely in the opposite direction to the direction of rotation 69, the tool support 57 stops when the engagement of the pins 63 in the borings 66 stops. In order to have the die head run back, the sense of direction is changed from arrow direction 69. Then, the cam 67 couples the tool support 57 with the driven part 52 until the screw tap leaves the workpiece. Then, the spring 60 causes pins 63 of the tool support 57 to engage the driven part 52.

FIG. 5 shows the application of the tool holder as a broaching tool. The driving part 70, the coupling part 71, the driven part 73, the housing 74 and the lock nut 75 act together just as in the embodiments described above. The seating of the tool support is different in that the latter is supported in the driven part 73 by means of two radial bearings 77, 78 and an axial bearing 79. As an the other constructions, the housing 74 is covered by a ring 80 which may simultaneously serve as a limit for radial displacement of the tool holder.

The tool holder, according to FIG. 5, operates as follows:

The broaching tool 81 is supported in a suitable manner in the tool support 76 and its cross section is polyhedral with exactly as many sides as the polyhedral hole that is to be broached. The tool holder is inserted, e.g., in the headstock of a lathe, and pressed against the rotating workpiece which is held, e.g., in the lathe chuck, after a cylindrical hole has been rough-drilled at the site of the polyhedral boring that is to be broached. The cylindrical rough-drill boring should be somewhat smaller than the circle inscribed in the polyhedron. In this case the tool rotates with the workpiece and this joint motion makes it possible to have the boring broached with relatively little expenditure of force. On account of its free play and accurate parallel operation, the tool holder is also well suited for such work.

The above description obviously suggests many possible variations and modifications of this invention which would not depart from its spirit and scope. It should be understood, therefore, that the invention is not limited in its application to the details of structure specifically described or illustrated and that within the scope of the appended claims, it may be practiced otherwise than as specifically described or illustrated.

I claim:
1. A tool holder for coupling a machine drive to a rotating tool with their axes of rotation permitted to become axially non-aligned while being maintained axially parallel, said tool holder comprising:
  (a) a driving part having a shank adapted to be engaged at one end by the machine drive, said shank having a threaded head portion at its other end and a plurality of straight, parallel, spaced ball bearing grooves of arcuate cross-section formed in the face of said head portion;
  (b) a driven part having a tool mounting portion at its free end adapted to receive and engage a rotating tool, a flanged portion on said driven part spaced from its free end and having a flanged face disposed parallel to said driving part head face, and a plurality of straight, parallel, spaced ball bearing grooves of arcuate cross-section formed in said flange face and disposed at right angles to said driving part head portion face grooves;
  (c) a centrally apertured disk-shaped coupling plate positioned between said driving part head portion face and said driven part flanged portion face, said coupling plate having upper and lower plate faces spaced from and parallel to said head portion face and flanged portion face, respectively, and a plurality of straight, parallel, spaced ball bearing grooves of arcuate cross-section formed in said upper and said lower coupling plate faces, said grooves in said upper face disposed at right angles to said grooves in said lower face;
  (d) ball bearings and retainers movably disposed in said opposed ball bearing grooves defining lines of contact therebetween, said ball bearings movably transmitting torque between said driving part and said driven part while permitting said driving and driven parts to become axially non-aligned;
  (e) a housing supportably enclosing said driving part, said coupling plate and said driven part, said housing having a threaded portion at one end for engagement with said driving part threaded head portion, and said housing also having a centrally inturned flanged collar at the other end for supportably retaining said driven part;
  (f) adjustable stop means engaging said housing for limiting lateral movement of said driven part relative to said driving part; and
  (g) a threaded locking ring member engaging said driving part and said housing for applying an axial pre-load on said driving part, said coupling plate and said driven part, and for applying adjustment loading as the need develops after the tool holder has been operated for a period of time.

2. Apparatus of claim 1 further having a centering spring supported at the inside wall of said housing to limit the radial deflection of and to center said driven part.

3. Apparatus of claim 1 further having a rotatable sleeve detachably mounted on said driven part to cover the gap corresponding to the largest deflection between said housing and said driven part.

4. Apparatus of claim 1 further having a rotatable masking sleeve mounted on said driving part for closing a control slot for ejection of the tool.

5. Apparatus of claim 1 wherein bearing means are provided between said housing and said driven part flanged portion.

6. Apparatus of claim 1 wherein said adjustable stop means threadably engages said housing and has an annular bearing surface concentrically spaced from said driven part.

References Cited
UNITED STATES PATENTS

| | | | |
|---|---|---|---|
| 1,398,679 | 11/1921 | Clark | 279—16 |
| 2,429,564 | 10/1947 | Petersen | 10—89X |
| 2,826,053 | 3/1958 | Munn | 279—16X |
| 3,421,770 | 1/1969 | Benjamin | 279—16 |

FOREIGN PATENTS 742,581    1955    Great Britain.

ANDREW R. JUHASZ, Primary Examiner